Oct. 29, 1968    J. BOUGARD    3,407,805

APPARATUS FOR SUBMERGED COMBUSTION HEATING

Filed Nov. 29, 1966    2 Sheets-Sheet 1

United States Patent Office 3,407,805
Patented Oct. 29, 1968

3,407,805
APPARATUS FOR SUBMERGED
COMBUSTION HEATING
Jacques Bougard, Monceau-sur-Sambre, Belgium, assignor to Ateliers J. Hanrez Societe Anonyme, Monceau-sur-Sambre, Belgium, a Belgian company
Filed Nov. 29, 1966, Ser. No. 597,816
Claims priority, application Belgium, Dec. 2, 1965, 21,107
9 Claims. (Cl. 126—360)

ABSTRACT OF THE DISCLOSURE

Submerged combustion apparatus in which a horizontal burner produces combustion gases in a chamber submerged in a heat transfer or primary liquid such that the combustion gases issue from the chamber into the primary liquid to form a turbulent mixture which passes through a heat exchanger, the combustion gases and liquid being separated after passage through the heat exchanger, the liquid being further separated from water which may have formed during combustion.

---

This invention has as an object the provision of an apparatus for heating by submerged combustion.

In its wider sense, submerged-combustion heating involves direct contact between the hot combustion gases and a heated liquid, a process which offers the advantage of using a heat exchanger of considerably reduced volume.

Another advantage consists in the fact that the combustion gases are evacuated at the same temperature as that of the liquid. If the latter is water or an aqueous solution that has been heated to a temperature below the dew point of the combustion gas, part of the steam produced by the combustion is condensed and the thermal efficiency of the apparatus, related to the net calorific value of the fuel, exceeds 100%.

On the other hand, submerged combustion suffers from the disadvantage that the heated liquid dissolves part of the soluble components of the combustion products, especially carbon dioxide, sulphur dioxide, sulphur trioxide, oxygen and becomes corrosive as regards ordinary metals. Another disadvantage is the difficulty of making the apparatus work at high pressure, in view of the great bulk required in that case for the container which, having to withstand the pressure, must also comprise the considerable space occupied by the heated liquid and, moreover, contain the means needed to cause this liquid to enter and leave the pressurized container.

Attempts have already been made to obviate these disadvantages by providing a heat exchanger surface between a heated fluid and a mixture of the gaseous fuel and a heat-transfer liquid which, below, will be referred to as the "primary liquid", in such a way as to avoid direct contact between the hot fuel gases and the heated fluid. The devices destined for this purpose usually comprise a vertical burner producing flames in the downward direction, either directly within the primary liquid or in a vertical combustion chamber communicating with a space containing the primary liquid.

In some cases the burner is capable of sliding in a vertical jacket, so that it can be withdrawn to a level above that of the primary liquid, this being absolutely necessary when the latter is a material with a high melting point exceeding the ambient temperature, and that it can be partially submerged in this material when the latter is in its molten state.

In other cases the vertical burner is fixed and may comprise an electrically fired pilot flame. The flame ignitor plate may either be permanently situated below the level of the primary liquid, or only while the apparatus is in operation, as a result of variations in the liquid level.

Generally speaking, it is not easy to ensure the continuous operation of submerged combustion by means of a vertical burner producing flames in the downward direction, nor to supervise and regulate a burner of this type. The passage of the combustion gas through a column of primary liquid may produce a considerable pressure drop, especially in apparatus of high heating capacity, so that it becomes difficult to operate the burner at the reduced pressure created by a running suction fan such as placed at the exhaust for the combustion gases, and it may prove necessary to provide compressors and control devices at the entry point for the liquid and gaseous fuels—a measure which is usually resorted to only with burners operating at a pressure higher than atmospheric pressure, without however being able to reap the complete benefit attendant to this type of combustion. Moreover, apparatus comprising a vertical burner producing flames in the downward direction may require an overall height such as to make them unsuitable for being accommodated in rooms of normal height or in the existing cellars with lowered ceiling, and one would be obliged to provide special rooms of great height which would of course raise installation costs.

The apparatus according to the present invention obviates these disadvantages while preserving the advantages of submerged combustion. It may easily be employed for any desired mode of combustion, whether at lowered, ordinary or elevated pressure, and it comprises a burner which produces flames easy to supervise and control. Its reduced bulk enables it to be built cheaply with a stainless alloy, and its height is only little increased for types of very high heating capacity.

To achieve this object, the apparatus of the invention comprises a horizontally positioned burner, capable of delivering flames into a combustion chamber co-axial with the burner and devised in such a way as to facilitate the mixture of the combustion gases with the primary liquid, as well as a space accessible to the mixture of the combustion gases and the primary liquid and containing a heat-exhanger one surface of which is heated by this mixture while its other surface is in contact with a stream of the heated fluid. It comprises moreover a device for separating the primary liquid from the combustion gases and a device for withdrawing from the primary liquid water which may have formed during combustion. If combustion takes place at a pressure higher than atmospheric pressure, the apparatus is provided with a device for expanding the combustion gases and, possibly, recovering the energy liberated by the expansion. The primary liquid whose volume is comparatively reduced, circulates in that case within the pressurized container, whereas the heated fluid is not affected by the pressurization of the submerged-combustion heating apparatus.

Advantageously the burner comprises, around a horizontal tube producing a pilot flame that reaches beyond the burner exit, a series of annular concentric ducts alternately supplied with liquid and gaseous fuel so as to produce several concentric flames. The innermost of these concentric flames, itself fired by the pilot flame, ensures the firing of one or more external flames which latter are arbitrarily regulatable by means of control elements included in the pipes connected to the annular concentric ducts which produce the outer flames. Thus, the power of the burner may be regulated easily between that of the inner flame alone and the total power composed of the inner and outer flames.

The horizontal tube which produces the pilot flame comprises a small bell-shaped compartment housing one or more firing plugs. These plugs are permanently surrounded by the gas enclosed in this bell even when primary liquid is allowed to penetrate into the burner after the apparatus has been stopped. This arrangement ensures rapid drying of the plugs once the apparatus has been started, at first by introducing gaseous fuel into the burner, in order to drive out the primary liquid. The horizontal tube comprises, moreover, an inspection hole for observation in axial direction and a photoelectric cell supervising the firing and the extinction of the pilot flame as well as the maintenance of the inner flame.

In one embodiment of the invention a horizontal combustion chamber situated below the heat exchanger comprises apertures through which the combustion gases are injected in the primary liquid so as to form with the latter a turbulent mixture surrounding the heat exchanger which latter is traversed by the heated fluid. When the apparatus is stopped the primary liquid is allowed to penetrate into the burner. Prior to firing, the liquid must be driven out of the burner and the latter dried in the above mentioned way.

In another embodiment the apparatus comprises a horizontal combustion chamber, at least partly surrounded by an outer sleeve provided with injection nozzles communicating with the combustion chamber, and connected to a primary liquid container through a pipe in which is included a circulating pump, so that the primary liquid taken from the container is conducted through the outer sleeve and injected in all flames produced in the combustion chamber, in order to form a mixture of primary liquid and combustion gases which is led past a heat exchanger arranged co-axially with the burner and following the combustion chamber and traversed by the heated fluid.

The device for separating the primary liquid from the combustion gases after the mixture has imparted its heat to the heated fluid preferably comprises a cyclone separator which may be provided with fixed vanes, and means for evacuating the combustion gases and for returning the primary liquid to its circuit. If combustion takes place at a pressure lower or substantially equal to atmospheric pressure, the means for evacuating the combustion gases comprises a suction fan following the cyclone separator in the circuit.

The device for withdrawing from the primary liquid water that has formed during combustion if the fuel contains hydrogen or hydrocarbons, may comprise a siphon pipe maintaining the primary liquid at its desired level, or a pump whose characteristic maintains the manometric level substantially constant for all outputs.

The accompanying drawings represent diagrammatically by way of example several embodiments of the invention.

Figure 1:
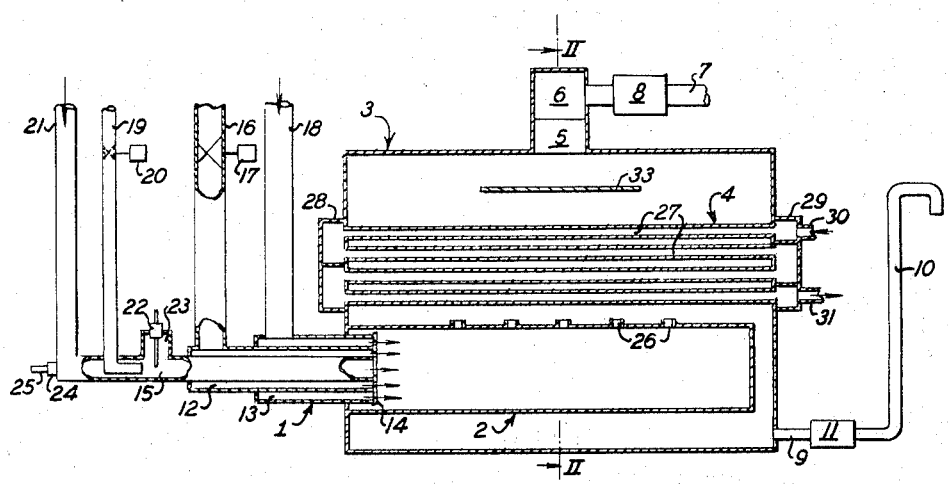
FIGURE 1 is a longitudinal section of a submerged combustion heating apparatus.

The apparatus of FIGURE 1 shows substantially a horizontal burner 1 and a combustion chamber 2, arranged co-axially of the burner in an enclosed container 3 and below a heat exchanger 4. The container 3 is provided with an exhaust 5 above which there is arranged a separator 6 with a pipe 7 in which a device 8 is included for the regulation of the pressure within the container, for example a suction fan if the container operates below, or nearly at, atmospheric pressure. At the base of the container 3 is provided a device for controlling the level of the primary liquid, which is generally water and partly fills the container and, when the apparatus stops, floods the combustion chamber. The control device comprises a pipe 9 and a tube 10 which latter may be a simple siphon tube. However, in the pipe 9 preferably a device 11 is included which ensures the maintenance of the level of primary liquid by causing evacuation of the water forming as a result of the combustion of a hydrogen-containing fuel. If the apparatus operates at low pressure or at atmospheric pressure, this device is preferably a pump with a characteristic such that the manometric level remains substantially constant for all outputs from zero to maximum.

Thet burner 1 is composed of annular conduits 12 and 13 which terminate in a firing plate 14 and are concentrically arranged around a horizontal tube 15 allocated to the pilot flame. One of the annular conduits, in the present case the conduit 12, is fed with liquid fuel through a pipe 16 provided with a preferably powered regulating valve 17, whereas the other annular conduit, i.e. the conduit 13, is fed with gaseous fuel through a pipe 18. The central conduit 15 receives liquid fuel for the pilot flame through a pipe 19, comprising a regulating valve 20, preferably also powered, and gaseous fuel through a pipe 21. The burner of the pilot flame is provided with an electric ignition device 22 contained in a bell-shaped compartment 23, a photoelectric cell 24 and an inspection hole 25 for observation of flames forming in the combustion chamber 2.

The combustion chamber is closed at the end and situated below the level of the primary liquid. On top it is provided with apertures or a longitudinal slot 26 through which the combustion gases are injected into the primary liquid, in order to form a turbulent mixture with the latter which completely floods the heat exchanger 4.

Figure 2:
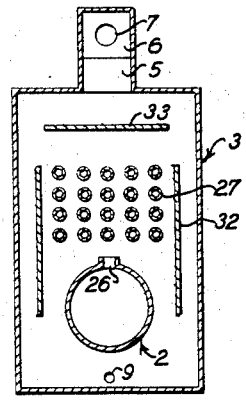
FIGURE 2 is a section on the line II—II of FIGURE 1.

The heat exchanger comprises a nest of pipes 27 which are connected to one another by boxes 28 and 29 in such a way that the heated fluid which enters at 30 and leaves at 31 traverses them alternately in opposite direction and, within the assembly, in countercurrent with the upward moving mixture consisting of combustion gases and primary liquid. This upward movement may be assisted by lateral guide plates 32 (FIG. 2).

Figure 3:
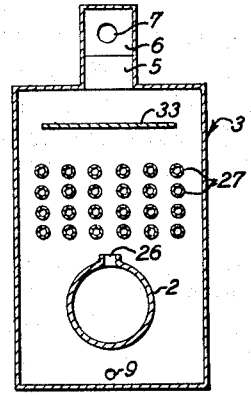
FIGURE 3 is an identical section to that of FIGURE 2, showing a modified embodiment.

FIGURE 3 shows a modified embodiment without these plates, but with an enlarged nest of tubes 27. The enclosed container 3 also comprises a deflector 33 situated below the exhaust 5.

When the plant is stopped, the combustion chamber and the burner fill with primary liquid. Prior to lighting the pilot flame it is necessary to drive out the liquid from the burner and to dry the latter. To this purpose the fan 8 is started which feeds air through the pipe 21 of the pilot burner and the pipe 18 of the main burner while the powered valves 17 and 20 which control the admission of fuel are closed.

The fan 8 has a characteristic such that the output of air diminishes only slightly when the manometric level rises, so that the amounts of air supplied to the pilot flame and the main flame remain substantially constant whatever the load drop in the combustion chamber and the enclosed container 3.

During the starting operation the electric ignition device 22 is dried by the air passing through the central tube 15. In order to render the ignition device operative as rapidly as possible it is preferably provided with two insulated plugs, each with a single electrode, and the plugs are arranged in the small bell 23 which remains filled with air even while the burner is flooded. In this way the plugs are safeguarded from direct contact with the liquid.

The starting-up operation may be controlled manually by observing through the inspection hole 25 the flashing of sparks between the electrodes after having applied a voltage across the ignition device 22, then observing the lighting of the pilot flame after having opened the valve 20, and the lighting of the main flame after having operated the valve 17, then the circulation of heated fluid through the heat exchanger and the starting up of the pump 11 if such a pump is provided, the latter being started before lighting the main flame. Preferably, however, the apparatus is started up automatically by making use of the photoelectric cell 24, the latter being connected in electrical circuits of known type, not described here. These circuits enable the photoelectric cell to supervise the pilot and main flames and to actuate the valves 20 and 17 at the proper moment, in order to open and close them, to actuate the valve 20 in order to extinguish the pilot flame while disconnecting at the same time the ignition circuit 22 as soon the the main flame has attained its normal state, or in order to close the valve 17, should the main flame become extinguished for some reason.

The main flame which substantially fills the combustion chamber 2 and prevents liquid from entering the latter, drives the hot combustion gases through the apertures or the narrow slot 26 into the primary liquid, so as to form with the latter a turbulent mixture with a strong rising tendency. The mixture moves up in the nest of tubes 27 which are rapidly traversed by the heated fluid from top to bottom. In view of the strong turbulence created in the mixture of primary liquid and combustion gases and the great speed of flow of the heated fluid in the heat exchanger, the heat exchange coefficients are very high, and even with a heat exchanger of reduced surface, the obtainable temperature differences between the heated fluid and the mixture of primary liquid and discharged combustion gases become very small.

Moreover, if this temperature is below the dew point of the combustion gases a large part of the water produced by the combustion of the hydrogen in the fuel is condensed, and the thermal efficiency, related to the net calorific value of the fuel, will exceed 100%.

In the region above the nest of tubes of the heat exchanger the mixture of combustion gases and primary liquid makes contact with the deflector 33 and becomes separated. The liquid returns to the lower part of the enclosed container 3, passing through the lateral channels formed by the container walls and the guide plates 32 (FIGURE 2), or along the container walls and past the outer tubes 27 in the modified embodiment of FIGURE 3 in which the principle of the countercurrent movement between primary liquid and heated fluid is no longer strictly observed without, however, any impairment to the thermal efficiency. The cooled combustion gases pass through the exhaust 5 and, after removal of the droplets of primary liquid in the separator 6, are drawn into the tube 7 by the fan 8 for evacuation, while the droplets fall back into the container 3.

Figure 4:
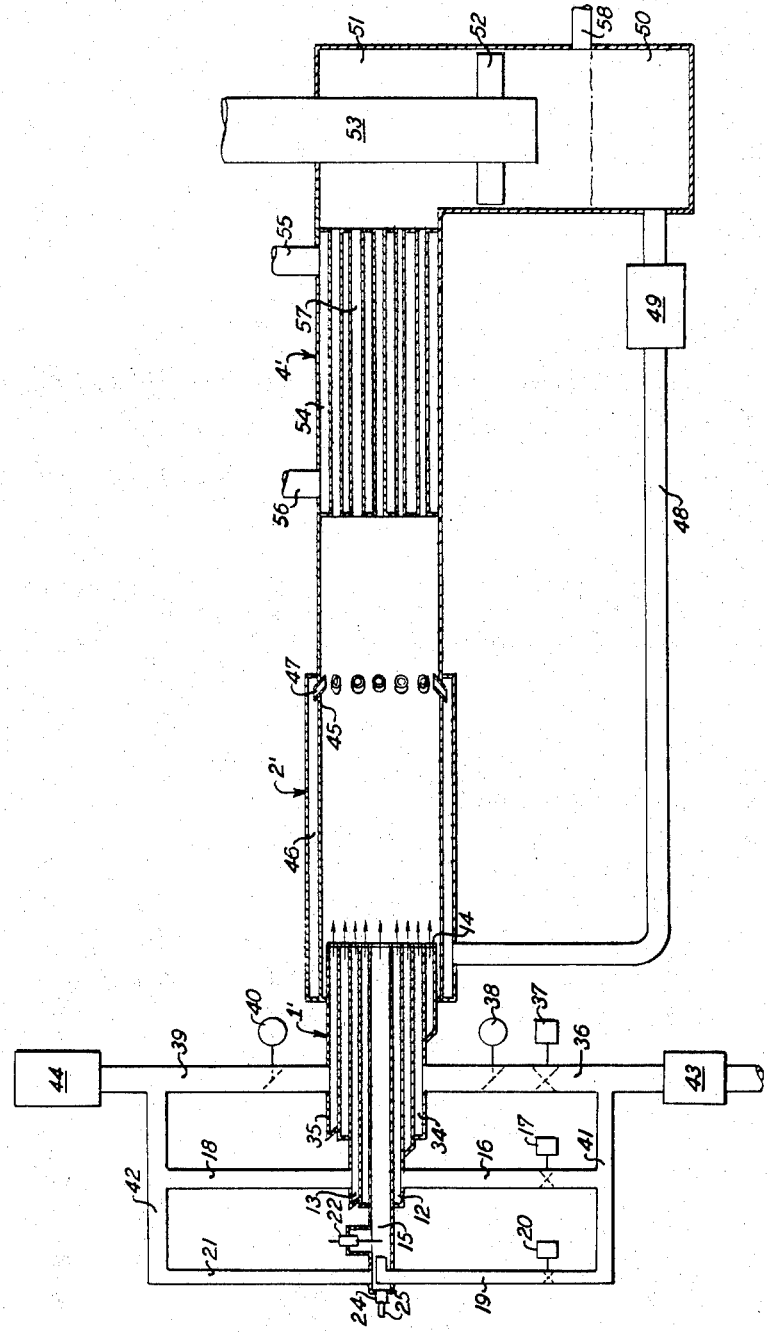
FIGURE 4 shows, in section, a modification of the sub-merged-combustion heating apparatus.

The apparatus of FIGURE 4 comprises elements similar to those described above, i.e. substantially a horizontal burner 1', a combustion chamber 2' and a heat exchanger 4', the latter being here arranged in line with the burner axis.

The burner 1' is substantially identical with the burner 1 of FIGURE 1, but the annular conduits arranged concentrically with the tube 15 and traversed alternately by liquid and gaseous fuels are here provided in larger number, so that a larger number of substantially tubular flames are produced which burn concentrically within one another. FIGURE 4 shows, on the one hand, the tube 15 allocated to the pilot flame and fed with fuel through the pipe 19 with valve 20 and with gaseous fuel through the pipe 21, the electric ignition device 22 being advantageously situated in the bell 23, the photoelectric cell 24 and the inspection hole 26, and on the other hand the annular conduits 12 and 13, surrounded concentrically by annular conduits 34 and 35. The annular conduits 12 and 34 are fed with liquid fuel, the former through the pipe 16 with regulating valve 17 and the latter through a pipe 36 with regulating valve 37 and valve 38. The annular conduits 13 and 35 are fed with gaseous fuel, the former through pipe 18 and the latter through a pipe 39 with valve 40. On the side from which liquid fuel is supplied the pipes 19, 16 and 36 are connected to one another by a distribution duct 41. Similarly, on the side from which gaseous fuel is supplied, the pipes 21, 18 and 39 are connected by means of a duct 42. On each side devices 43 and 44 respectively regulate the pressure of the liquid fuel and the gaseous fuel in such a way that they arrive at the firing plate 14 at substantially identical pressure. According to whether combustion takes place at atmospheric or higher pressure, and also according to the nature of the liquid fuel, the device 43 may for example be a pressure-reducing device or a rotary compressor for the gaseous fuel, and the device 44, for example, a fan or air compressor.

When the valve 37 and the valves 38 and 40 are closed, this burner operates in the same way as has been explained in connection with the burner 1. With the valve 37 open and the valves 38 and 40 more or less open, around the flame a second flame is produced whose intensity is regulatable by means of the valves in such a way that the total capacity of the burner 1' may vary between that corresponding to the inner flame and that corresponding to the sum total of flames.

The combustion chamber 2' comprises a tubular element 45, partly surrounded by an outer sleeve 46 which is provided with a ring of nozzles 47 and connected by means of a pipe 48 with circulating pump 49 to a reservoir 50 containing the primary liquid. This reservoir occupies the lower part of a device for separating the cooled mixture of combustion gases and primary liquid and comprising in a container 51 fixed blades 52 and a chimney 53 for the evacuation of combustion gases.

The heat exchanger 4' is situated horizontally in line with the combustion chamber and arranged between the latter and the container 51. It comprises an element 54 rapidly traversed by the heated fluid which enters through a tube 55 and leaves through a tube 56, and a nest of tubes 57 ("fire tubes") which constitute the link between the combustion chamber and the container 51.

In order to start up the apparatus, primary liquid is pumped into the outer sleeve 46 by means of the circulating pump 49, and from there is injected in the combustion chamber through nozzles 47, the fluid to be heated is conducted through the heat exchanger 4', and the burner 1' is ignited substantially in the same way as has been described in connection with the burner 1. When the flames burn normally in the combustion chamber, the primary liquid, injected in the hot combustion gases, forms with the latter a mixture which traverses the nest of tubes 57, surrendering its heat to the fluid to be heated. Here, too, a heat exchanger of comparatively reduced surface will suffice to cool down the mixture of combustion gases and primary liquid to a temperature hardly higher than that of the heated fluid at the exit 56. In the container 51 where it meets the fixed blades 52, the primary liquid becomes separated from the combustion gases and drops back into the reservoir 50, whereas the combustion gases are evacuated through the chimney 53.

If the temperature of the mixture of combustion gases and primary liquid entering the container 51 is below the dew point of the combustion gases, the water which has formed during combustion is condensed and must be drawn off at the rate at which it forms so as to maintain constant the volume of primary liquid recirculated in the apparatus. If the primary liquid is water and combustion takes place at a pressure near atmospheric pressure, draining may be effected through a pipe 58, provided at the water level of the reservoir 50.

Obviously, the apparatus of FIGURE 4 may also be provided with a single-flame burner such as shown in FIGURE 1, and a multiple-flame burner in which at least one flame is subject to arbitrary regulation, see FIGURE 4, may also be provided in an apparatus such as shown in FIGURE 1. Furthermore, a submerged-combustion heater according to the invention, whether it provides for the injection of combustion gases into the primary liquid (FIGURE 1) or the injection of the primary liquid in the combustion gases (FIGURE 4), may of course operate above atmospheric pressure, while the pressure chosen for the heated liquid passing through the heat exchanger need not be affected thereby. In that case the burner must comprise a fan or compressor 44 (FIGURE 4) on the side from which gaseous fuel is supplied, and a device 43 on the side from which liquid fuel is supplied which, as the case may be, is a pressure-reducing device if the fuel is a compressed gas, or a compressor which brings a gas that has not been compressed up to the pressure required in the gaseous fuel. Moreover, the exhaust 53 which serves for evacuating the combustion gases, and the element 58 for draining water that has formed during combustion must be provided with a pressure-reducing device which, in the chimney 53 may be a turbine if the selected pressure justifies this.

It should be understood that the invention is by no means limited to the embodiments described here and illustrated by way of example, and modifications made to these embodiments would not constitute a departure from the scope of the invention.

I claim:

1. Submerged-combustion heating apparatus comprising a horizontally arranged burner means, a combustion chamber arranged coaxially with said burner means for the production of heated combustion gases therein by said burner means, said chamber being provided with an outlet for the combustion gases, a second chamber containing a heat transfer liquid which is in communication with the combustion gases via said outlet, the heat transfer liquid and combustion gases being mixed in the second chamber, a heat exchanger in said second chamber in communication with the mixture of combustion gases and heat transfer liquid whereby a fluid passing through the heat exchanger is heated by said mixture, means for separating the liquid and the combustion gases after passage through the heat exchanger, means for separating from the liquid any water which may have formed during combustion and means for expanding the combustion gases if combustion takes place above atmospheric pressure and for recovering the energy liberated by the expansion.

2. Apparatus according to claim 1, wherein the burner means comprises a horizontally extending central tube in which a pilot flame is produced which issues from a burner exit, a series of concentric annular conduits fed alternately with liquid fuel and gaseous fuel, in order to produce several concentric flames of which the inner flame, itself lit by the pilot flame, ensures the lighting of one or more outer flames regulatable arbitrarily by means of control devices included in the supply pipes connected to the concentric annular conduits which produce the outer flames in such a way that the power of the burner may be regulated between that of the inner and outer flames.

3. Apparatus according to claim 2, comprising a small bell-shaped compartment on the horizontal burner tube including at least one sheltered plug for lighting the pilot flame in such a way that each plug is permanently surrounded by gas enclosed in the bell even when liquid is allowed to penetrate into the burner while the apparatus is inoperative whereby rapid drying of the plugs is obtained when the apparatus is started up and, first, the gaseous fuel is introduced in the burner, in order to drive out the liquid.

4. Apparatus according to claim 1 wherein the combustion chamber extends horizontally and is situated below the heat exchanger, said outlet for the combustion gases being apertures through which the combustion gases are injected into the liquid so as to form with the latter a turbulent mixture surrounding the heat exchanger which is traversed by the fluid.

5. Apparatus according to claim 1 wherein said combustion chamber extends horizontally, an outer sleeve at least partly surrounding the combustion chamber and provided with injection apertures leading to the combustion chamber, a reservoir filled with said liquid, means connecting said reservoir and the injection apertures such that the liquid from the reservoir is conducted through the outer sleeve and injected into the combustion chamber to produce a mixture of liquid and combustion gases which is passed through said heat exchanger, the latter being arranged coaxially with the burner and downstream of the combustion chamber.

6. Apparatus according to claim 1 wherein the means for separating the liquid from the combustion gases after the mixture has passed through the heat exchanger, comprises a separator, and means for evacuating the combustion gases and for recirculating the liquid.

7. Apparatus according to claim 6, wherein the means for evacuating the combusion gases comprises a suction fan if combustion takes place at or below atmospheric pressure.

8. Apparatus according to claim 1, wherein the means for withdrawing from the liquid any water that may have formed during combustion comprises a siphon which maintains the liquid at a prescribed level in said second chamber.

9. Apparatus according to claim 1, wherein the means for withdrawing from the liquid any water which may have formed during combustion comprises a pump in communication with the liquid in the second chamber with a characteristic such that the manometric level remains substantially constant for all outputs, from zero to maximum.

References Cited

UNITED STATES PATENTS

| | | | |
|---|---|---|---|
| 2,358,302 | 9/1944 | Brosius | 126—360 |
| 2,677,368 | 5/1954 | Janecek | 126—350 |
| 2,878,644 | 3/1959 | Fenn | 126—360 X |
| 3,060,921 | 10/1962 | Luring et al. | 126 350 |
| 3,171,405 | 3/1965 | Miller | 126—360 |
| 3,224,431 | 12/1965 | Holden | 126—355 |
| 3,291,119 | 12/1966 | Sullivan | 126—350 |

JAMES W. WESTHAVER, *Primary Examiner.*